May 15, 1928.

H. A. LAUHOFF 1,669,526

CAKE MOLD FILLING MACHINE

Filed Dec. 17, 1924      2 Sheets-Sheet 1

Inventor
Henry A. Lauhoff,

Attorney

May 15, 1928.

H. A. LAUHOFF 1,669,526

CAKE MOLD FILLING MACHINE

Filed Dec. 17, 1924

Inventor
Henry A Lauhoff,
By
Attorneys

Patented May 15, 1928.

1,669,526

UNITED STATES PATENT OFFICE.

HENRY A. LAUHOFF, OF DETROIT, MICHIGAN.

CAKE-MOLD-FILLING MACHINE.

Application filed December 17, 1924. Serial No. 756,444.

This invention relates to apparatus for use in certain stages of the process of manufacturing flake biscuits or cakes and more particularly of a certain type of biscuit or cake wherein corn flakes or similar flakes are pressed in a more or less dampened condition in molds for the purpose of effecting their reduction as a whole to bodies of predetermined size and shape preparatory to their being baked or toasted, and also for the purpose of effecting or assisting in the effecting of the adhesion of the flakes together whereby a certain amount of stability is given to the molded body and to the subsequent cake or biscuit produced upon the baking thereof.

The molds used in the stage of the process to which this invention appertains preferably comprise cellular frames removably mounted upon trays, the cells for the reception of the flakes being circular and arranged in suitable series with their upper ends open for the reception of such flakes; and this invention has reference to apparatus for the filling of such molds with flakes in a convenient, efficient and speedy manner, whereby large numbers of such molds may be progressively and thoroughly filled in a manner eminently suitable for quantity production of such cakes or biscuits.

In the filling of such molds, it is proposed to pass them successively beneath a flake feeding device whereby a quantity of such flakes are caused to be fed to the molds and into the cells thereof as the molds are successively presented to such feeding means, the quantity of flakes so fed to the molds being somewhat in excess of the amount required to properly fill the cells thereof, in order to ensure the said cells being fully filled; and owing to the nature of such flakes there is a normal tendency which varies somewhat from time to time to dispose themselves in such manner that certain of the cells would not be properly filled, due to the formation of pockets therein and to the failure of the flakes to lie together in a satisfactory manner under ordinary conditions, the molds being also heaped up or covered with such excess flakes which are not accommodated in the cells thereof.

This invention, therefore, has for its object the provision in combination with means for the filling of the molds in the manner referred to of agitators and cleaners for said flakes and the upper surfaces of the molds, whereby a motion is imparted to the flakes which assists in the proper filling of the cells of the molds, a slight compression of the flakes into the said cells is effected to further ensure the filling thereof and a cleaning of the upper surfaces of the molds of excess flakes is obtained.

A further object of the said invention is to provide in such a mold filling machine, rotary devices operating immediately above the upper surfaces of the molds as they are progressively passed through the machine for effecting of the said agitating, compression and cleaning functions heretofore referred to; a still further object being to provide for the prevention of undue accumulation of flakes on the rotary agitating devices which might otherwise interfere with their effective operation, especially where flakes of a particularly adhesive nature are to be contended with.

It is also an important object of the said invention to provide for a feeding back of excess flakes or flakes extending above the top of the molds to the rearward portions of the mold or to molds following in progression through the machine, whereby the said feed back acts as an auxiliary feed to assist in the filling of cells, which upon the initial reception of flakes have not become thoroughly filled; and a still further object is to provide for the multiplying of this feed back operation whereby several stages of the same are utilized to still further ensure the thorough filling of the cells of the molds.

A consequent aim of the invention is to provide for the carrying forwardly with the molds of an excess of flakes and the subsequent carrying rearwardly of the molds of such excess of flakes in order that may provide for deficiencies in the original filling of the cells of the molds and also to provide for agitation of the said flakes when being moved rearwardly for the purposes indicated.

It is also proposed by my invention to provide for the regulation of the speed of feed back of the excess flakes and incidentally the vigor of the agitation thereof and the speed of initial feed to the molds, whereby the speed of operation of the machine and of feeding flakes to the molds may be determined and the quantity and density or weight of the mass of flakes filling the cells varied to suit requirements; a still further object being to provide a mold filling machine having agitators of the type suggested wherein the speed of travel of the molds through the machine and the speed of operation of the agitators may be both increased or decreased, as well as provision be made for the varying of the capacity of the feed of flakes to the said molds as they travel through the machine.

Still further objects subsidiary to or resulting from the aforesaid objects, or from the construction or operation of the invention as it may be carried into effect, will become apparent as the said invention is hereinafter further disclosed.

In carrying the said invention into effect, I may provide a mold filling machine in which are combined mold conveying means in the form of an endless track or conveyor above which is arranged flake feeding means beneath which means the molds travel, and from which the said molds receive a stream of flakes during such travel in such quantity as may be regulated to more or less fill the cells of the molds and provide an excess of flakes extending above the upper surfaces of the said molds; and rotary agitators in the form of shafts provided with a plurality of radial arms rotating in proximity to the upper surfaces of the molds as they travel through the machine and passing over the said surfaces in a direction contrary to the progress of the molds, together with a rotary wiper or cleaner situated beyond the said agitators, means being provided for the varying of the speed of operation of said agitators together with the speed of travel of the said molds and also for varying the amount of the feed of flakes to the said molds.

All of which is more particularly described and ascertained hereinafter, by way of example, having reference to the accompanying drawings, in which Figure 1 is a plan view of a mold filling machine embodying the said invention;

Similar characters of reference indicate similar parts in the several figures of the drawings.

Figure 1:
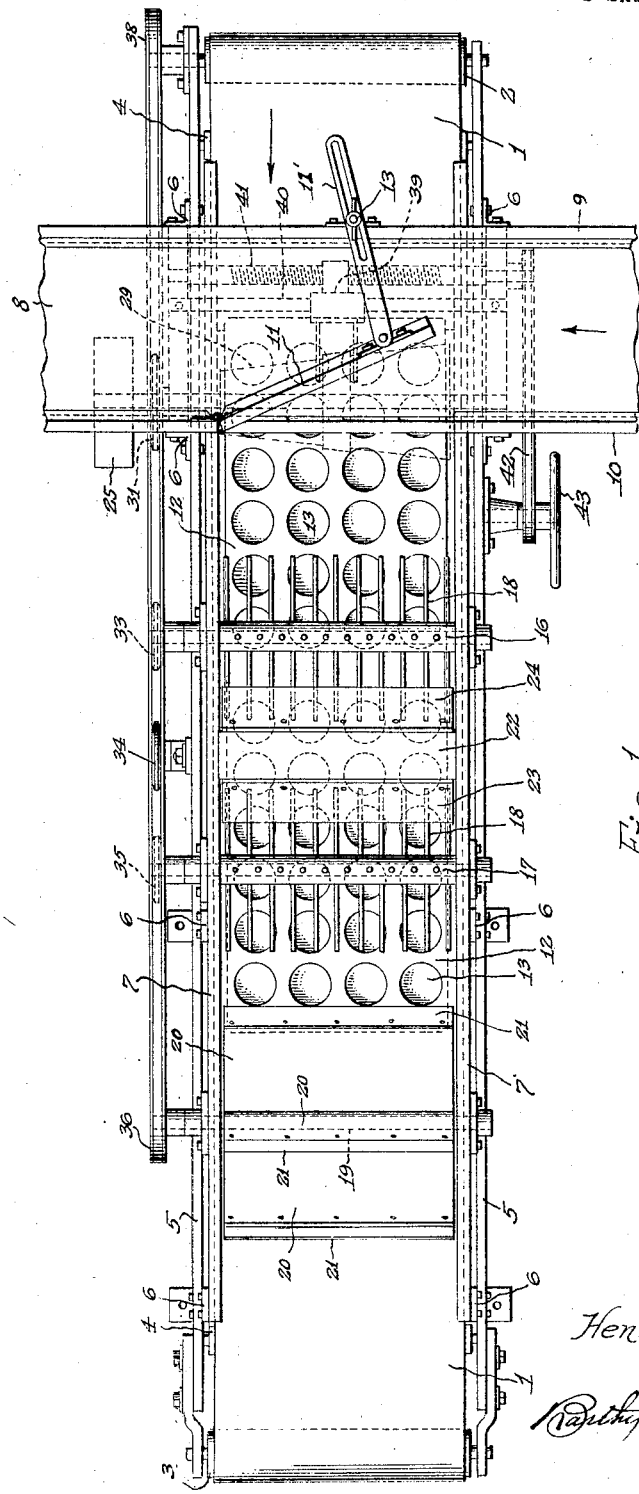

The mold filling machine includes a longitudinal belt conveyor 1 mounted on rollers 2 and 3 and intermediately supported by rollers 4, all of which rollers are carried by members 5 of side frames 6, said conveyor being laterally enclosed by walls 7 secured to the upper parts of the said frames; and 8 is a transversely extending belt conveyor passing above the first mentioned conveyor between walls 9 and 10, the latter of which is provided with an adjustably swingable gate 11 which is adapted to be secured in adjusted positions by means of the slotted link 11′ and thumb screw 13. This gate serves to interrupt material passing along the conveyor 8 and cause it to be directed through the opening of the gate 11 in a quantity governed by the extent to which the said gate is opened.

The illustrated machine is more particularly intended for use in the making of flaked cereal biscuits or cakes, the flakes being fed to the machine by the conveyor 8 which will hereinafter be referred to for convenience as the "flake conveyor" and the molds are fed through the machine by the conveyor 1 which will be hereinafter referred to as the "mold conveyor".

The molds in this example are indicated by the numeral 12 in general and are of cellular construction, having a plurality of mold cavities or cells 13 therein of cylindrical formation, open at the top for the reception of flakes and open at the bottom for the removal of the same when required, the lower ends of the said cells being however normally closed by removable trays 14 during the filling operation. The said molds are adapted to be conveyed successively from the forward end of the machine underneath the flake conveyor 8 and beneath an apron 15 extending downwardly from beneath the outlet formed by the door 11, whereby the said molds will receive flakes directed from the said conveyor 8 by the door 11 when the machine is in operation, the adjustment of the said door 11 being such that a volume of flakes somewhat in excess of that required to ordinarily fill the molds may be caused to fall thereon as the molds issue from beneath the apron 15 with the result that the cells of the said molds will be more or less filled with flakes, and a layer of flakes will also be provided on the top of the said molds for purposes which will be more particularly described.

Ordinarily, the flakes falling from the conveyor 8 onto the said molds and into the cells thereof may not arrange themselves in a manner resulting in the proper filling of the said cells, pockets being caused, which are spaces within the cells unoccupied fully by flakes, or a lack of parallel arrangement between the more or less flattened flakes which causes the cells to be apparently filled when only loosely filled, a lack of density of the mass in such cases being present.

It is, therefore, necessary that further manipulation of the flakes should be effected in order to produce a more complete and orderly filling of the said cells to ensure the eventual production of a biscuit or cake having the full amount of material therein and of the required density due to the presence of such full amount of material; and it is for that reason that an excess or overflow of flakes on the molds is provided for subsequent manipulation to bring about the desired result.

The manipulation consists in the moving or raking of the excess flakes over the molds in an opposite direction to the travel of said molds so that the cells which have already received flakes from the conveyor 8 will be again subjected to the action of a body of flakes moving thereover in an agitated manner, which agitation is more or less transmitted also to the flakes within the said cells and tends to result in the shaking down or an economical arrangement of the flakes within the cells and consequently the better filling thereof; and this agitation of flakes may be continued in further stages as the molds pass through the machine.

Figure 2:
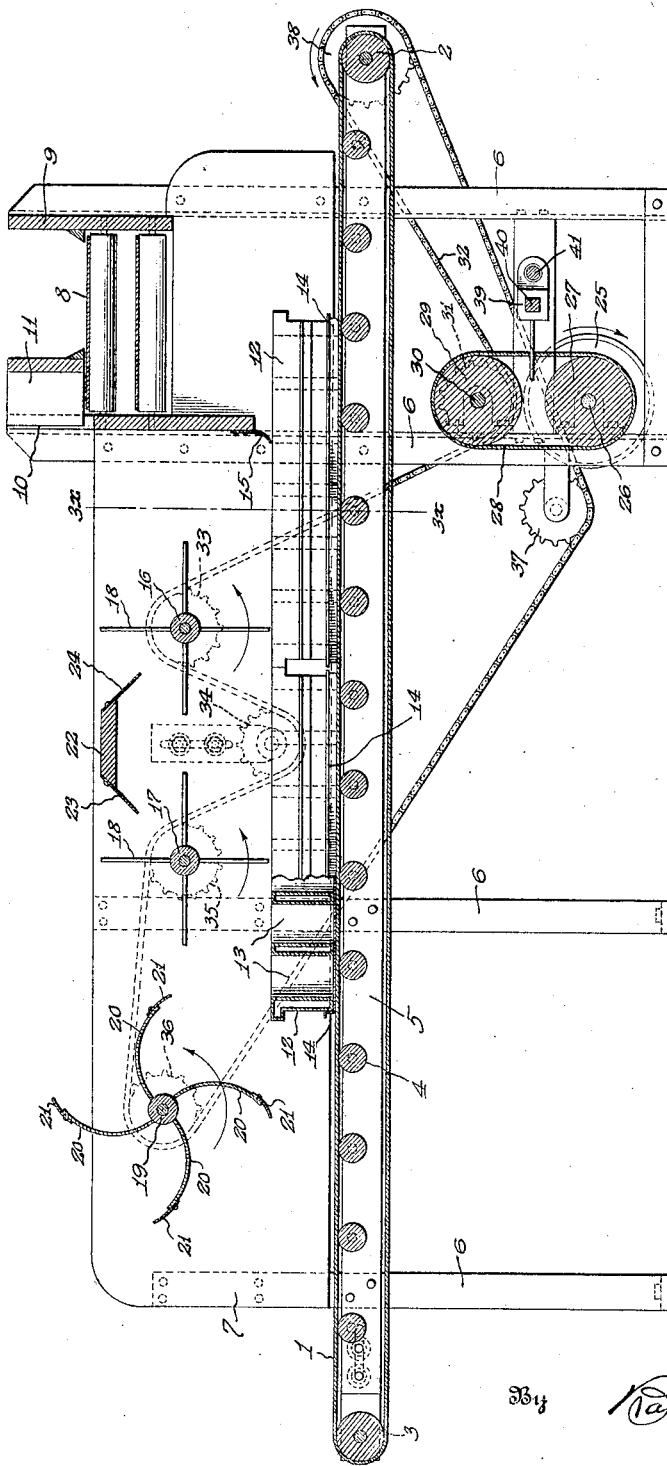
Figure 2 is a vertical longitudinal section of the said machine.
Figure 3:
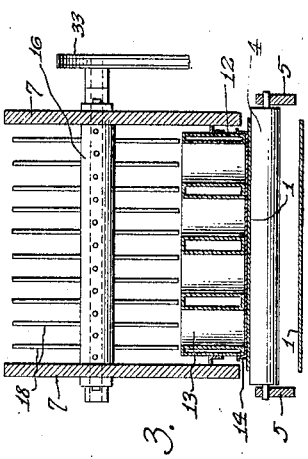
Figure 3 is a fragmentary transverse section of the same taken on the line 3×—3× of Figure 2.

To effect this agitation, I provide between the wall 7 and the machine, rotary rakes or agitators in the form of shafts 16 and 17, each having a plurality of radial arms 18 extending therefrom of such length that when rotated their ends pass close to the upper surfaces of the molds travelling through the machine and their direction of rotation being opposed to that of the travel of the said molds as indicated by the arrows in Figure 2, so that as the molds with the excess of flakes lying thereon pass beneath the rotary agitators, the arms thereof will engage the flakes and throw them back towards the apron 15 for the purpose and with the result hereinbefore explained.

19 is a further rotary shaft arranged rearwardly of the said agitators and having mounted thereon arcuate plates or arms 20 having flexible extensions 21 thereon of rubber, leather or other suitable material, said device forming a cleaner beneath which the molds finally pass and by which any remaining excess flakes are cleaned therefrom and fed towards the adjacent agitators.

The effect of these agitators and of the cleaner is to produce waves of flakes which are more or less continuously being piled up by the cleaner in the path of the descending arms of the final agitator, and then by this agitator in the path of the descending arms of the preceding agitator and so on, which is very effective in bringing about the desired result; and by the adjustment of the door 11, a well regulated quantity of such excess flakes may be secured which does not materially increase in quantity as the machine is operated for any length of time, but which is sufficient to maintain a required body of excess flakes above the molds.

Usually, these flakes are dampened or otherwise treated so that they are somewhat of an adhesive nature, and to prevent them accumulating upon the arms of the agitators, I provide intermediate of the said agitators, a transverse bridge piece 22 having flexible wipers 23 and 24 thereon which extend into the paths of the arms of the agitators and remove therefrom any flakes which may become attached thereto.

The operation of the machine is effected through a driving pulley 25 mounted on a shaft 26 which carries a conical drum 27 geared by a shiftable belt 28 to a reversely coned drum 29 mounted on the shaft 30, which shaft also carries a sprocket wheel 31 which meshes with an endless chain 32. The said chain passes successively over the first agitator sprocket 33, the adjustable idler 34, the second agitator sprocket 35, the cleaner sprocket 36, idler sprocket 37 mounted on the frames of the machine, and the mold conveyor sprocket 38 which drives the roller 2 of the said mold conveyor, and to vary the speed of operation of the said conveyor 1, the agitators and the cleaner, I provide a belt shifter 39 mounted upon a transverse bar 40 adjustable transversely of the machine by a feed screw 41 operable through the medium of the chain 42 by a hand wheel 43, the change of speed effected by the shifting of the said belt over the relatively inversely coned pulleys being well understood and therefore not calling for further description.

The conveyor 8 is preferably separately driven and may be of considerable length when driven from a point quite remote from the mold filling machine so that the driving means of the said conveyor 8 are not illustrated in the accompanying drawings, the said conveyor being driven in any suitable or usual manner and the nature and operation of the flake conveyor does not form an essential part of the invention as any suitable or convenient means of feeding flakes to the mold filling machine may be adopted.

In an arrangement such as that described, molds may be continuously fed by the conveyor beneath the apron 15 and efficiently filled as they pass beneath the agitators and final cleaner so that when they issue from the delivery end of the machine they will be ready for the next operation in the process of producing biscuits or cakes of the type being manufactured; and with such a machine as that described the filling of molds may be effected very efficiently and on a high production basis which is of great benefit in the commercial manufacture of such articles wherein speed is desirable, but uniformity in the filling and arrangement of the flakes in the cells of the molds is as a rule even more desirable.

In the manufacture of flaked biscuits or cakes produced by the pressing together of moistened or otherwise treated cereal flakes, the manner in which such flakes are arranged in the molds and pressed together has a very considerable bearing of quality and stability of the finished product so that the results brought about by the use of the described apparatus are of substantial importance as they enter largely as a factor into the commerical value of the products in the manufacture of which the said apparatus is intended to be utilized.

This invention may be developed within the scope of the following claims without departing from the essential features of the said invention, and it is desired that the specification and drawing be read as merely illustrative and not in a limiting sense, except as necessitated by the prior art.

What I claim is:—

1. In a machine for filling molds with flaked material, a series of molds, a mold conveyor, a flake conveyor discharging thereonto, skeleton agitators adapted to lift excess flakes extending above said molds to ensure the effective filling of said molds.

2. In a machine for filling molds with flaked material, a series of molds, a mold conveyor, a flake conveyor discharging thereonto, skeleton agitators adapted to lift excess flakes extending above said molds, and means for varying the relative discharge of the flake conveyor to the speed of the mold conveyor, whereby the density of the filling of said molds is regulated.

3. In a machine for filling molds with flaked material, a series of molds, a mold conveyor, a flake conveyor discharging thereonto, skeleton agitators adapted to lift excess flakes extending above said molds, and means for varying the speed of the mold conveyor and agitators relative to the discharge of the flake conveyor.

4. In a machine for filling molds with flaked material, a series of molds, a mold conveyor, a flake conveyor discharging thereonto, skeleton agitators adapted to lift excess flakes extending above said molds, said agitators being coupled to the mold conveyor for joint operation, and means controlling the speed of both whereby greater agitation of excess flakes will accompany higher speed of said mold conveyor.

5. In a machine for filling molds with flaked material, a series of molds, a mold conveyor, a flake conveyor discharging thereonto, skeleton agitators adapted to lift excess flakes extending above said mold, and wipers engageable by said agitators.

6. A process of filling cake molds consisting in feeding flakes into a series of molds, sweeping the tops of certain of said molds to lift the excess flakes therefrom, and permitting said lifted excess to fall upon other molds of the series.

7. A process of filling cake molds consisting in feeding flakes into a moving series of molds, sweeping the tops of certain of said molds to lift the excess flakes therefrom, and permitting said lifted excess to fall upon other molds of the series.

In testimony whereof I affix my signature.

HENRY A. LAUHOFF.